US012513639B2

(12) United States Patent
Xu et al.

(10) Patent No.: US 12,513,639 B2
(45) Date of Patent: Dec. 30, 2025

(54) METHOD AND APPARATUS FOR DETERMINING MEASUREMENT ASSISTANCE INFORMATION

(71) Applicant: Lenovo (Beijing) Limited, Beijing (CN)

(72) Inventors: Min Xu, Beijing (CN); Lianhai Wu, Beijing (CN); Haiming Wang, Beijing (CN); Jing Han, Beijing (CN); Jie Shi, Beijing (CN); Jie Hu, Beijing (CN); Ran Yue, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 355 days.

(21) Appl. No.: 18/032,077

(22) PCT Filed: Oct. 16, 2020

(86) PCT No.: PCT/CN2020/121535
§ 371 (c)(1),
(2) Date: Apr. 14, 2023

(87) PCT Pub. No.: WO2022/077445
PCT Pub. Date: Apr. 21, 2022

(65) Prior Publication Data
US 2023/0388951 A1    Nov. 30, 2023

(51) Int. Cl.
*H04W 56/00* (2009.01)
*H04W 48/10* (2009.01)
*H04W 52/28* (2009.01)

(52) U.S. Cl.
CPC ....... *H04W 56/0045* (2013.01); *H04W 48/10* (2013.01); *H04W 52/283* (2013.01)

(58) Field of Classification Search
CPC ............ H04W 56/0045; H04W 48/10; H04W 52/283; H04W 36/0085; H04W 36/0088;
(Continued)

(56) References Cited

U.S. PATENT DOCUMENTS

2017/0251456 A1   8/2017   Radulescu
2019/0174482 A1   6/2019   Mok et al.
(Continued)

FOREIGN PATENT DOCUMENTS

CN    107787004 A    3/2018
CN    109391960 A    2/2019
(Continued)

OTHER PUBLICATIONS

PCT/CN2020/121535, "International Preliminary Report on Patentability", PCT Application No. PCT/CN2020/121535, Apr. 27, 2023, 5 pages.
(Continued)

*Primary Examiner* — Hashim S Bhatti
(74) *Attorney, Agent, or Firm* — FIG. 1 Patents

(57) ABSTRACT

The present application relates to a method and an apparatus for determining measurement assistance information. One embodiment of the subject application provides a method performed by a User Equipment (UE), comprising: determining measurement assistance information, wherein the measurement assistance information is used for determining or adjusting one or more measurement windows for one or more neighboring Base Stations (BSs) or one or more neighboring cells; and transmitting the measurement assistance information to a serving BS of the UE; or adjusting the measurement window based on the measurement assistance information.

20 Claims, 11 Drawing Sheets

(58) Field of Classification Search
CPC ... H04W 52/242; H04W 84/06; H04W 24/10; H04B 17/364; H04B 17/24; H04B 17/347
See application file for complete search history.

(56) References Cited

U.S. PATENT DOCUMENTS

| | | | |
|---|---|---|---|
| 2019/0261206 A1* | 8/2019 | Gheorghiu | H04W 52/0229 |
| 2022/0263569 A1* | 8/2022 | Fan | H04W 56/001 |
| 2023/0052779 A1* | 2/2023 | Niu | H04L 5/0057 |
| 2023/0127719 A1* | 4/2023 | Kim | H04W 24/10 370/329 |

FOREIGN PATENT DOCUMENTS

| | | |
|---|---|---|
| CN | 109391970 A | 2/2019 |
| CN | 111757339 A | 10/2020 |
| WO | 2018172996 A1 | 9/2018 |

OTHER PUBLICATIONS

PCT/CN2020/121535, "International Search Report and Written Opinion", PCT Application No. PCT/CN2020/121535, Feb. 3, 2021, 6 pages.

20957223.9, "European Search Report", Application No. 20957223.9, Jun. 5, 2024, 13 pages.

Huawei, et al., "MAC CE signalling for multi-beam enhancement", 3GPP TSG-RAN WG2 Meeting#108, R2-1914676, Reno, USA [retrieved Oct. 16, 2023]. Retrieved from the Internet <https://www.3gpp.org/ftp/tsg_ran/WG2_RL2/TSGR2_108/Docs>, Nov. 2019, 13 pages.

Oppo, "Discussion on mobility management for connected mode UE in NTN", 3GPP Draft; R2-2006784, vol. RAN WG2, No. Electronic; Aug. 17, 2020-Aug. 28, 2020, Aug. 2020, 4 pages.

"Communication under Rule 71(3) EPC", EP Application No. 20957223.9, May 13, 2025, 89 pages.

* cited by examiner

METHOD AND APPARATUS FOR DETERMINING MEASUREMENT ASSISTANCE INFORMATION

TECHNICAL FIELD

The subject application relates to wireless communication technology, especially to a method and an apparatus for determining measurement assistance information.

BACKGROUND OF THE INVENTION

In Non-terrestrial Networks (NTN), the user equipment (UE) may experience large propagation delay difference between the UE to its serving base station (BS) and the UE to the neighboring BS or neighboring cell. This large propagation delay difference may cause a misalignment of the configured measurement window from the serving BS and the synchronization signal block (SSB) or channel status information (CSI)—reference signals (RS) measurement window from the neighboring BS or the neighboring cell at the UE. Therefore, the UE may not be able to determine the measurement assistance information for the neighboring BS or neighboring cell.

Therefore, it is desirable to provide a solution for determining the measurement assistance information in the networks with large propagation delay difference.

SUMMARY

One embodiment of the subject application provides a method performed by a User Equipment (UE), comprising: determining measurement assistance information, wherein the measurement assistance information is used for determining or adjusting one or more measurement windows for one or more neighboring Base Stations (BSs) or one or more neighboring cells, and transmitting the measurement assistance information to a serving BS of the UE; or adjusting the measurement window based on the measurement assistance information.

Another embodiment of the subject application provides a method performed by a Base Station (BS), comprising: receiving a measurement assistance information from a User Equipment (UE), wherein the measurement assistance information is used for determining or adjusting one or more measurement windows for one or more neighboring BSs or one or more neighboring cells; or receiving an adjustment report for adjusting the measurement window from the UE, wherein the measurement window is configured for the UE to determine the measurement assistance information for one or more neighboring Base Stations or one or more neighboring cells.

Yet another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a User Equipment (UE), comprising: determining measurement assistance information, wherein the measurement assistance information is used for determining or adjusting one or more measurement windows for one or more neighboring Base Stations (BSs) or one or more neighboring cells; and transmitting the measurement assistance information to a serving BS of the UE; or adjusting the measurement window based on the measurement assistance information.

Still another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a Base Station (BS), comprising: receiving a measurement assistance information from a User Equipment (UE), wherein the measurement assistance information is used for determining or adjusting one or more measurement windows for one or more neighboring BSs or one or more neighboring cells; or receiving an adjustment report for adjusting the measurement window from the UE, wherein the measurement window is configured for the UE to determine the measurement assistance information for one or more neighboring Base Stations or one or more neighboring cells.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

For terrestrial networks the round-trip propagation delay can be less than 0.1 ms. However, there are networks with large round-trip propagation delay. For example, in NTN, the delay difference in a cell can be relatively large due to the size of the cell and satellite-to-ground propagation delay. For low earth orbit (LEO) cell at 600 km altitude orbit, the round-trip propagation delay can be up to 25.77 ms, and for geosynchronous orbit satellite (GEO) cell, the round-trip propagation delay can be up to 541.46 ms. Even if the serving BS can compensate its propagation delay to the UE, the propagation delay difference can still be 3.12 ms for LEO cell at 600 km altitude orbit, and may be 10.3 ms for a GEO cell, or even larger.

Figure 1A:
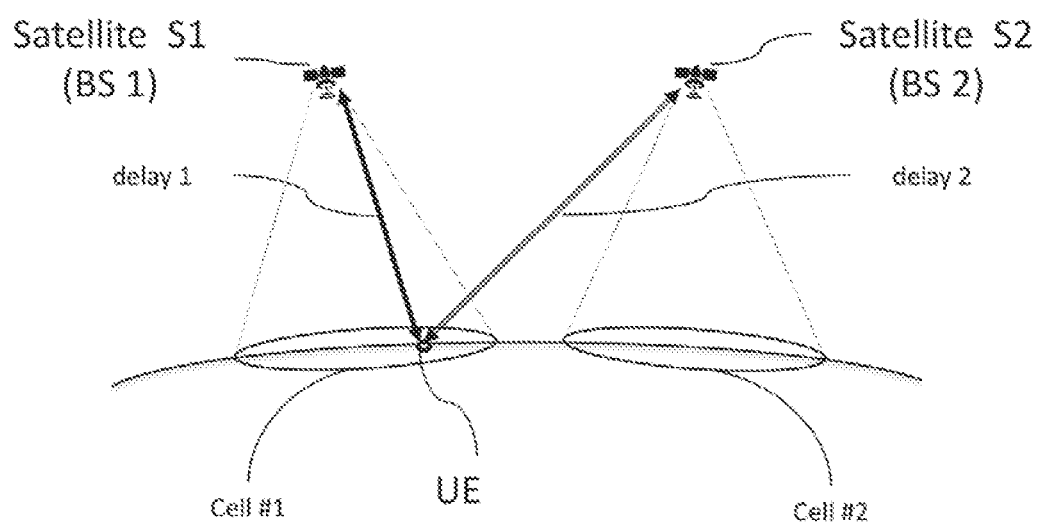
FIG. 1A illustrates a schematic diagram of a propagation delay difference between a UE and two BSs in accordance with some embodiments of the subject disclosure.
Figure 1B:
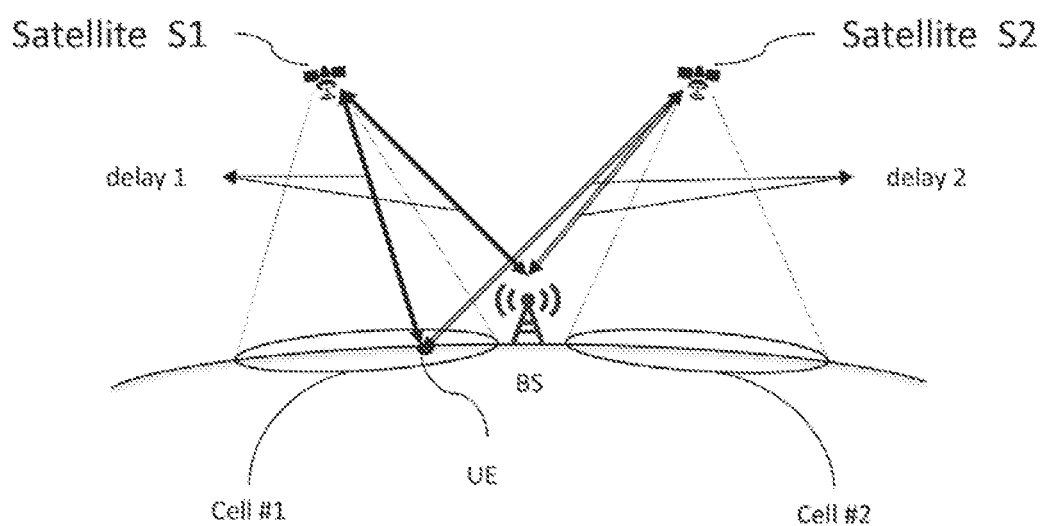
FIG. 1B illustrates another schematic diagram of a propagation delay difference between a UE and two BSs in accordance with some embodiments of the subject disclosure.
Figure 1C:
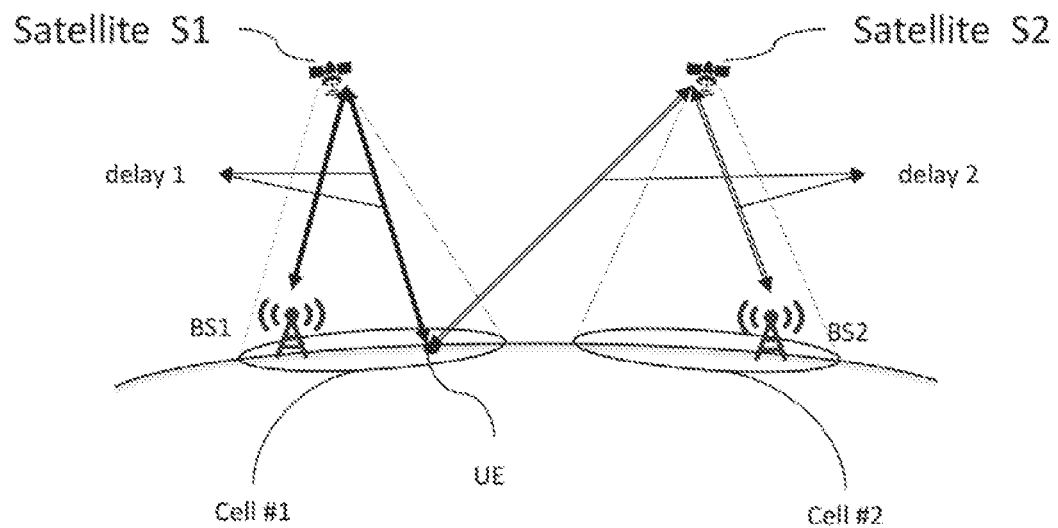
FIG. 1C illustrates still another schematic diagram of a propagation delay difference between a UE and two BSs in accordance with some embodiments of the subject disclosure.

More specifically, the propagation delays difference in the NTN are shown in FIGS. 1A-1C.

FIG. 1A illustrates a schematic diagram of a propagation delay difference between a UE and two BSs in accordance with some embodiments of the subject disclosure.

As shown in FIG. 1A, the wireless communication system includes two satellites, satellite 1 and satellite 2, and a UE. The two satellites function in a regenerative mode, that is, all or part of base station functions, e.g., a gNB, eNB, etc., are implemented on board, and the two satellites are considered as two BSs, BS1 and BS2. Satellite 1 covers the cell #1, and satellite 2 covers the cell #2. The propagation delay from UE to BS1 is the service link delay from UE to Satellite S1, i.e. delay 1, and the propagation delay from UE to BS2 is the service link delay from UE to Satellite S1. i.e. delay 2.

In FIG. 1B, the wireless communication system includes two satellites, satellite S1 and satellite S2, a UE, and a BS, BS1. The two satellites function in a transparent mode. Satellite 1 covers the cell #1, and satellite 2 covers the cell #2, and the two cells are served by BS1. The propagation delay from UE to cell #1 is the service link delay from UE to Satellite S1 plus the feeder link delay from Satellite S1 to BS1, i.e. delay 1, and the propagation delay from UE to BS is the service link delay from UE to Satellite S1 plus the feeder link delay from Satellite S2 to BS1, i.e. delay 2.

In FIG. 1C, the wireless communication system includes two satellites, satellite 1 and satellite 2, a UE, and two BSs, BS1 and BS2. The two satellites function in a transparent mode. Satellite 1 covers the cell #1, and satellite 2 covers the cell #2, and the two cells are served by BS1 and BS2 respectively. The propagation delay from UE to BS1 or cell #1 is the service link delay from UE to Satellite S1 plus the feeder link delay from Satellite S1 to BS1. i.e. delay 1, and the propagation delay from UE to BS2 or cell #2 is the service link delay from UE to Satellite S2 plus the feeder link delay from Satellite S2 to BS2 i.e. delay 2.

Although merely two BSs are illustrated in FIGS. 1A-IC for simplicity, it is contemplated that the wireless communication system may include more BSs in some other embodiments of the present application. Similarly, although merely one UE are illustrated in FIGS. 1A-1C for simplicity, it is contemplated that the wireless communication system may include more UEs in some other embodiments of the present application.

The BSs may also be referred to as an access point, an access terminal, a base, a macro cell, a node-B, an enhanced node B (eNB), a gNB, a home node-B, a relay node, or a device, or described using other terminology used in the art.

The BS is generally part of a radio access network that may include a controller communicably coupled to the BS.

The UE may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE may include wearable devices, such as smart watches, fitness bands, optical head-mounted displays, or the like. Moreover, the UE may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system is compatible with any type of network that is capable of sending and receiving wireless communication signals. For example, the wireless communication system is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

Figure 2A:
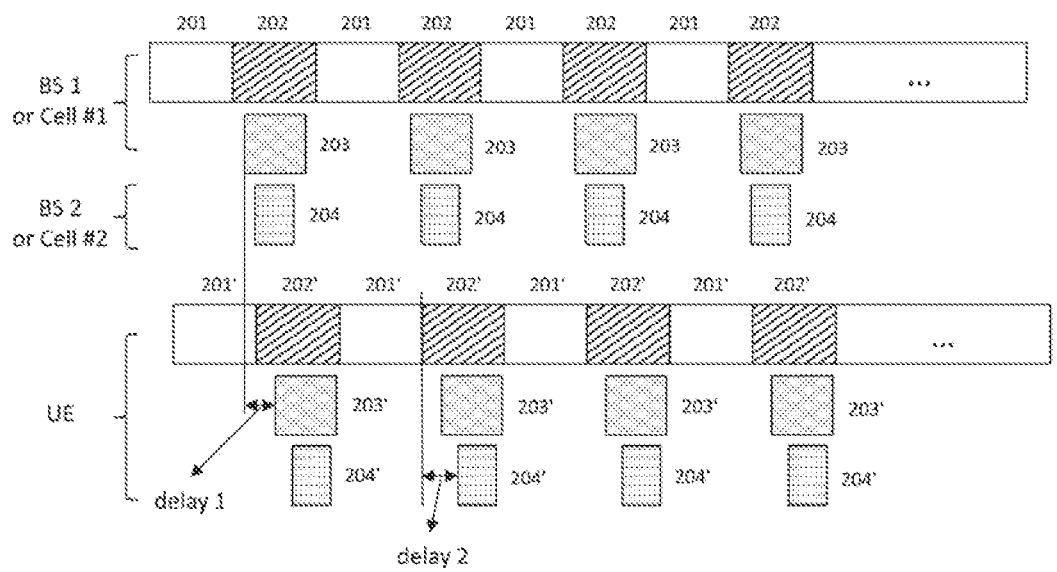
FIG. 2A illustrates a timeline for measurement configuration in accordance with some embodiments of the subject disclosure.

FIG. 2A illustrates a timeline for measurement configuration in accordance with some embodiments of the subject disclosure.

In FIG. 2A, BS1 or cell #1 is the serving BS or the serving cell for the UE. BS2 or cell #2 is the neighboring BS or the neighboring cell for the UE. Block 201 represents the resources for UE, block 202 represents the resources not for UE, block 203 represents the measurement window from the serving BS, BS1, block 204 represents synchronization signal block (SSB) window, or Channel Status Information (CSI)—reference signal (RS) measurement window from BS2, block 201' represents the resources for UE at the UE side, block 202' represents the resources not for UE at the UE side, block 203' represents the measurement window at the UE side, and block 204' represents synchronization signal block (SSB) window for BS2 at the UE side.

As shown in FIG. 2A, due to the propagation delay, the measurement window 203 at the BS1' side and the measurement window 203' at the UE' side has a propagation delay, represented as delay 1, and the SSB window 204 at the BS2' side and the measurement window 204' at the UE' side has a propagation delay, represented as delay 2. Because the difference between delay 1 and delay 2 are not large, thus the UE is able to measure the synchronization signal from neighboring BS2 in the measurement window configured by serving BS1.

Figure 2B:
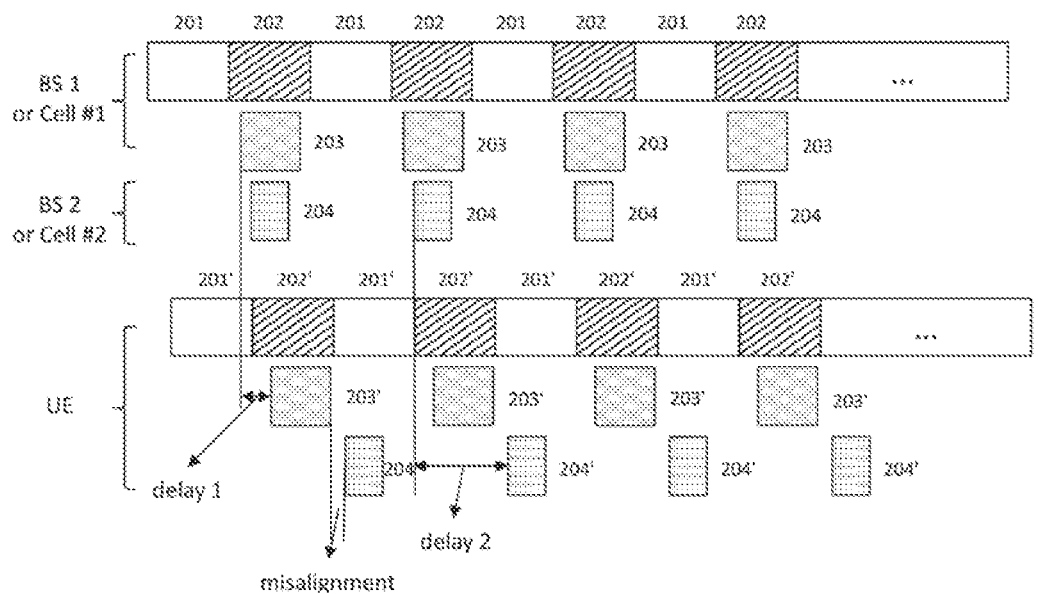
FIG. 2B illustrates another timeline for measurement configuration in accordance with some embodiments of the subject disclosure.

FIG. 2B illustrates another timeline for measurement configuration in accordance with some embodiments of the subject disclosure.

In FIG. 2B, the difference between delay 1 and delay 2 are rather large, the UE is not able to measure the synchronization signal from neighboring BS2 during the measurement window 203' configured by serving BS1. The measurement window 203' and the SSB window 204' are not aligned. Then the UE may fail in neighboring cell measurement.

The primary cause of this issue is that serving BS is unaware of the propagation delay difference between the propagation delay of the UE to BS1 and propagation delay of the UE to BS2.

The present disclosure proposes to several solutions to solve this misalignment.

In the first solution, the present disclosure proposes that the procedure of UE transmits measurement assistance information to the serving BS, which includes its propagation delay to the neighboring BS or its propagation delay difference to the serving and neighboring BS/cells, so as to help the serving BS/cell to configure measurement window appropriately considering the propagation delay difference.

Figure 3:
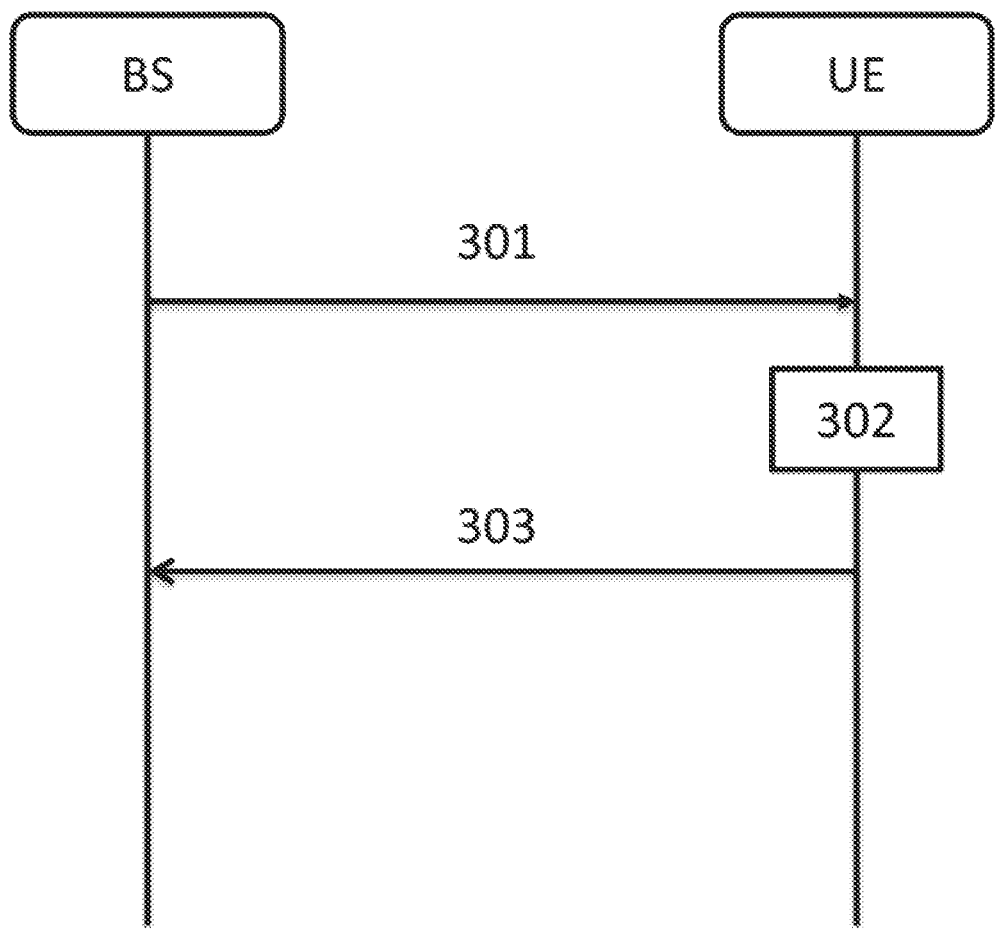
FIG. 3 illustrates a flow chart for determining measurement assistance information in accordance with some embodiments of the subject disclosure.

FIG. 3 illustrates a flow chart for determining measurement assistance information in accordance with some embodiments of the subject disclosure.

In step 301, the serving BS of the UE transmits a request for the measurement assistance information report to the UE, or transmits a configuration for the measurement assistance information report to the UE. The request or configuration may be transmitted via system information broadcasting, for example, in a system information block (SIB), or it may be transmitted in delicate signaling, e.g. Radio Resource Control (RRC) signaling. Correspondingly, the UE may receive the request or configuration via system information broadcasting, or in dedicated signaling.

In step 302, the UE determines the measurement assistance information based on the request of the configuration.

In one embodiment, the BS may request or configure measurement assistance information report at a granularity of per neighboring cell. That is, the BS may transmit one request or one configuration for each neighboring BS or cell of the UE, alternatively, the BS may transmit one request or one configuration for multiple neighboring BSs or multiple neighboring cells of the UE. Correspondingly, the measurement assistance information determined by the UE includes one report for each neighboring cell. For example, when the UE is located in cell #1, and the neighboring cells include cell #2 and cell #3, the BS then transmits one request or configuration for cell #2 and one request or configuration for cell #3, then the measurement assistance information determined by the UE may include measurement assistance information for cell #2 and measurement assistance information for cell #3.

The BS may request or configure measurement assistance information report at a granularity of per neighboring BS. That is, the BS may transmit one request or one configuration for each neighboring BS of the UE, or transmit one request or one configuration for multiple neighboring cells of the UE. Correspondingly, the measurement assistance information determined by the UE may include one report for each neighboring BS. For instance, when the UE is served by BS1, and the neighboring BSs include BS2 and BS 3, the BS then transmits one request or configuration for BS2 and one request or configuration for BS 3, then the measurement assistance information determined by the UE may include measurement assistance information for BS2 and measurement assistance information for BS 3.

The BS may still request or configure measurement assistance information report dependent on ranges of one or more parameters, these parameters may include at least one of the following: propagation delay, timing advance, distance, receiving power, and/or power pathloss. Correspondingly, the measurement assistance information determined by the UE includes reports dependent on ranges of these parameters. Take the parameter propagation delay as an example, the BS may request or configure the UE to transmit one measurement assistance information report for propagation delay less than 1 ms, one report for propagation delay ranged from 1 ms to 10 ms, one report for propagation delay ranged from 10 ms to 20 ms, and one report for propagation delay larger than 20 ms. Correspondingly, the measurement assistance information report determined by the UE may include one report for propagation delay less than 20 ms, one report for propagation delay ranged from 1 ms to 10 ms, one report for propagation delay ranged from 10 ms to 20 ms, and one report for propagation delay larger than 20 ms. The reports based on other parameters are determined in similar ways.

In another embodiment, the BS may request or configure the content of the measurement assistance information report to the UE.

The content of the measurement assistance information may include at least one the following parameters:

i. round-trip or single-trip propagation delay from the UE to a neighboring BS or a neighboring cell, for example, in FIG. 1C, the serving BS, BS1 may request the UE to include the round-trip propagation delay from the UE to the neighboring BS, BS2, in the measurement assistance information report.

ii. estimated timing advance from the UE to a neighboring BS or a neighboring cell, for instance, in FIG. 1C, BS1 may request the UE to include the estimated timing advance from the UE to BS2 in the measurement assistance information report.

iii. distance between the UE to a neighboring BS or a neighboring cell. E.g. in FIG. 1C, BS1 may request the UE to include the distance between the UE to BS2 in the measurement assistance information report.

iv. receiving power of a neighboring BS or a neighboring cell at the UE. E.g. in FIG. 1C, BS1 may request the UE to include the receiving power of BS2 in the measurement assistance information report.

v. power pathloss from a neighboring BS or a neighboring cell to the UE. E.g. in FIG. 1C. BS1 may request the UE include power pathloss from a neighboring BS to the UE in the measurement assistance information report.

vi. round-trip or single-trip propagation delay difference from the UE to a neighboring BS or a neighboring cell and its serving BS. For example, in FIG. 1C, BS1 may request the UE to include the round-trip propagation delay difference from the UE to BS2 and the UE to BS1 in the measurement assistance information report.

vii. estimated timing advance difference from the UE to a neighboring BS or a neighboring cell and its serving BS. For example, in FIG. 1C, BS1 may request the UE to include the estimated timing advance difference from the UE to a BS2 and the UE to BS1 in the measurement assistance information report.

viii. distance difference between the UE to a neighboring BS or a neighboring cell and its serving BS. For example, in FIG. 1C, BS1 may request the UE to include the distance difference from the UE to a BS2 and the UE to BS1 in the measurement assistance information report.

ix. receiving power difference of a neighboring BS or a neighboring cell and its serving BS at the UE. For example, in FIG. 1C, BS1 may request the UE to include the receiving power difference from the UE to a BS2 and the UE to BS1 in the measurement assistance information report.

x. power pathloss difference from a neighboring BS or a neighboring cell and its serving BS to the UE. For example, in FIG. 1C, BS1 may request the UE to include the power pathloss difference between the power pathloss of BS2 and the power pathloss of BS1 in the measurement assistance information report.

xi. ID of a neighboring cell belonging to the same BS or a neighboring BS or a neighboring cell. For example, in FIG. 1C, BS1 may request the UE to include the ID of BS2 or the ID of cell #2 in the measurement assistance information report.

xii. a reference signal with a time stamp. For example, in FIG. 1C, BS1 may request the UE to include the reference signal with a time stamp of BS2 or the reference signal with a time stamp of cell #2 in the measurement assistance information report.

The request or configuration may further include other parameters, and the above parameters are for illustrating, not limiting. After receiving the request or configuration, the UE shall determine the parameters indicated in the request or configuration in the report.

In step 302, the UE may determine the measurement assistance information based on derivation from location information or positioning information of UE and the neighboring BS or the neighboring cell, for example, the location information may include satellite ephemeris. The UE may also determine the measurement assistance information based on history propagation delay, timing advance, distance to the neighboring BS or the neighboring cell. The UE may also determine the measurement assistance information based on history result of conventional signal measurement of the neighboring BS or the neighboring cell, for instance, the conventional signal may be the reference signal, and the UE may determine the measurement assistance information based on the history reference signal receiving power (RSRP). The UE may also determine the measurement assistance information based on broadcast from the neighboring BS or the neighboring cell. For example, the neighboring BS may broadcast the feeder link delay, the common propagation delay, etc. . . . .

In step 303, the UE transmits the measure assistance information to the BS. The UE may transmit the measurement assistance information in a dedicated singling, for example, the RRC singling. The UE may also transmit the measurement assistance information as a part of existing singling, for instance, the measurement report or UE assistance information. The UE may transmit the measurement assistance information via a random access message, for example, Msg3 in the four-step random access procedure, MsgA in the two-step random access procedure, or Msg5. The UE may transmit the measurement assistance information in a MAC CE (Control Element).

Regarding the timing for transmitting the measurement assistance information to the BS, the BS may indicate that the UE may transmit the measurement assistance information when the serving BS transmits a request or a configuration for the measurement assistance information. Accordingly, when the UE receives a request or a configuration for the measurement assistance information from the serving BS, the UE may transmit the measurement assistance information to the serving BS.

The BS may configure one or more conditions in the request or the configuration for the measurement assistance information, and when at least one condition is met, the UE may transmit the measurement assistance information to the serving BS. Accordingly, at the UE side, when the UE determines that at least one condition indicated in the request or the configuration is met, the UE may transmit the measurement assistance information to the serving BS.

The BS may configure when the measurement assistance information is available, the UE may transmit the measurement assistance information to the serving UE. Accordingly, when the measurement assistance information is available, the UE may transmit the measurement assistance information to the serving BS.

The BS may configure a period to the UE, and the UE may transmit the measurement assistance information to the serving BS periodically with this period. Similarly, the BS may configure one or more timers to the UE, and the UE may transmit the measurement assistance information to the serving BS when one of the one or more timers expires.

The BS may configure a range of a parameter to the UE, and when the value of the parameter is within the configured range, the UE may transmit the measurement assistance information to the serving BS. The parameter may include propagation delay, timing advance, distance, receiving power, power pathloss of a neighboring BS or a neighboring cell. Take the parameter propagation delay as an example, the BS may configure the UE to transmit the measurement assistance information when the propagation delay of a neighboring BS is less than 10 ms, within the range from 10 ms to 20 ms, or larger than 20 ms. The parameter may also be propagation delay difference, timing advance difference, distance difference, receiving power difference, power pathloss difference of a neighboring BS or cell and the serving BS. Correspondingly, at the UE's side, the UE may transmit the measurement assistance information when the propagation delay difference of a neighboring BS and the serving BS is less than 10 ms, within the range from 10 ms to 20 ms, or larger than 20 ms.

The BS may transmit a configuration of neighboring BS or neighboring cell measurement to UE, and the UE then determines the measurement assistance information, and transmits the measurement assistance information to the serving BS.

The BS may configure the UE to transmit the measurement assistance information to the serving BS when the UE fails to measure a reference signal from a neighboring BS or a neighboring cell.

In some embodiment, the UE may indicate its capability of reporting measurement assistance information to the serving BS. The UE may also indicate the availability of measurement assistance information to the serving BS.

The first solution relates to the UE determining the measurement assistance information, and transmits the measurement assistance information report to the serving BS of the UE. After receiving this report, the BS may adjust the measurement window 203 as shown in FIGS. 2A and 2B, such that the measurement window 203' would be aligned with the SSB window 204' at the UE's side.

Alternatively, in the second solution, instead of transmitting these information to the BS, the UE may use the measurement assistance information to offsetting or extending the measurement window from the serving BS.

Figure 4A:
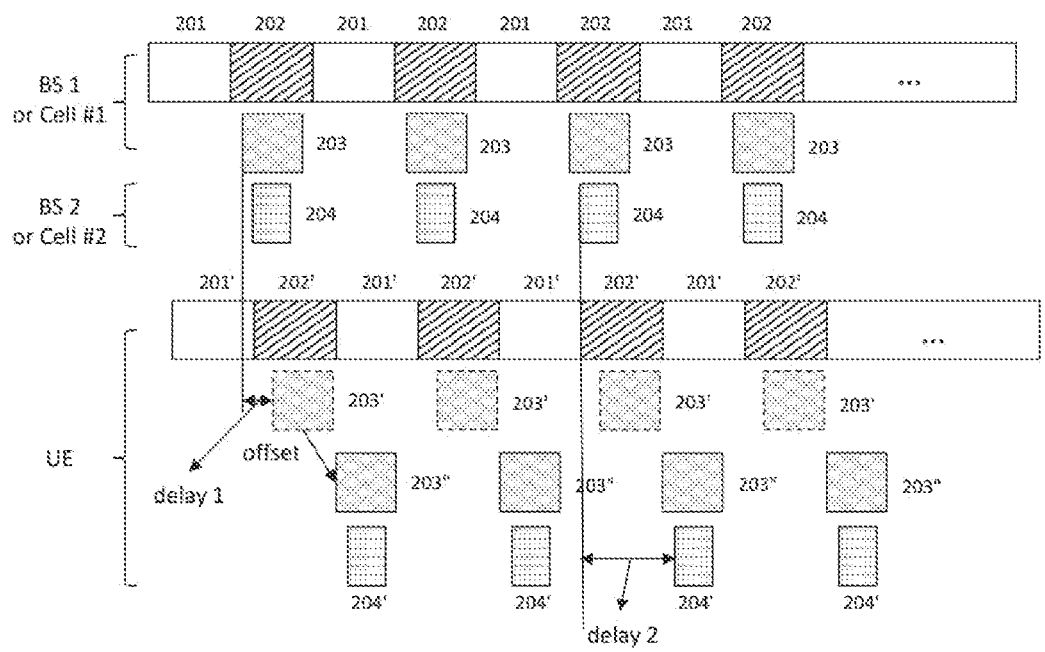
FIG. 4A illustrates a timeline with offset measurement window in accordance with some embodiments of the subject disclosure.

FIG. 4A illustrates a timeline with offset measurement window in accordance with some embodiments of the subject disclosure.

In FIG. 4A, the UE first determines the measurement assistance information based on the existing configuration for measurement assistance information. That is, the UE determines the measurement assistance information in a similar fashion as in the first solution proposed by the present disclosure.

Specifically, the content of the measurement assistance information may include at least one the following parameters:

i. round-trip or single-trip propagation delay from the UE to a neighboring BS or a neighboring cell, for example, in FIG. 1C, the serving BS, BS1 may request the UE to include the round-trip propagation delay from the UE to the neighboring BS. BS2, in the measurement assistance information report.

ii. estimated timing advance from the UE to a neighboring BS or a neighboring cell, for instance, in FIG. 1C, BS1 may request the UE to include the estimated timing advance from the UE to BS2 in the measurement assistance information report.

iii. distance between the UE to a neighboring BS or a neighboring cell. E.g. in FIG. 1C, BS1 may request the UE to include the distance between the UE to BS2 in the measurement assistance information report.

iv. receiving power of a neighboring BS or a neighboring cell at the UE. E.g. in FIG. 1C. BS1 may request the UE to include the receiving power of BS2 in the measurement assistance information report.

v. power pathloss from a neighboring BS or a neighboring cell to the UE. E.g. in FIG. 1C, BS1 may request the UE include power pathloss from a neighboring BS to the UE in the measurement assistance information report.

vi. round-trip or single-trip propagation delay difference from the UE to a neighboring BS or a neighboring cell and its serving BS. For example, in FIG. 1C, BS1 may request the UE to include the round-trip propagation delay difference from the UE to BS2 and the UE to BS1 in the measurement assistance information report.

vii. estimated timing advance difference from the UE to a neighboring BS or a neighboring cell and its serving BS. For example, in FIG. 1C, BS1 may request the UE to include the estimated timing advance difference from the UE to a BS2 and the UE to BS1 in the measurement assistance information report.

viii. distance difference between the UE to a neighboring BS or a neighboring cell and its serving BS. For example, in FIG. 1C, BS1 may request the UE to include the distance difference from the UE to a BS2 and the UE to BS1 in the measurement assistance information report.

ix. receiving power difference of a neighboring BS or a neighboring cell and its serving BS at the UE. For example, in FIG. 1C, BS1 may request the UE to include the receiving power difference from the UE to a BS2 and the UE to BS1 in the measurement assistance information report.

x. power pathloss difference from a neighboring BS or a neighboring cell and its serving BS to the UE. For example, in FIG. 1C, BS1 may request the UE to include the power pathloss difference between the power pathloss of BS2 and the power pathloss of BS1 in the measurement assistance information report.

xi. ID of a neighboring cell belonging to the same BS or a neighboring BS or a neighboring cell. For example, in FIG. 1C, BS1 may request the UE to include the ID of a BS2 or the ID of cell #2 in the measurement assistance information report.

xii. a reference signal with a time stamp. For example, in FIG. 1C, BS1 may request the UE to include the reference signal with a time stamp of BS2 or the reference signal with a time stamp of cell #2 in the measurement assistance information report.

It should be noted that the above parameters are for illustrating, not limiting.

The UE may determine the measurement assistance information based on derivation from location information or positioning information of UE and the neighboring BS or the neighboring cell, for example, the location information may include satellite ephemeris. The UE may also determine the measurement assistance information based on history propagation delay, timing advance, distance to the neighboring BS or the neighboring cell. The UE may also determine the measurement assistance information based on history result of conventional signal measurement of the neighboring BS or the neighboring cell, for instance, the conventional signal may be the reference signal, and the UE determine the measurement assistance information based on the history reference signal receiving power (RSRP). The UE may also determine the measurement assistance information based on broadcast from the neighboring BS or the neighboring cell. For example, the neighboring BS may broadcast the feeder link delay, the common propagation delay, etc. . . . . .

After the UE determines the measurement assistance information, the UE may offset or extend the measurement window. For example, in FIG. 4A, the UE offsets the measurement window 203' to the measurement window 203". In this way, the UE is able to determine the measurement assistance information of BS2 in the measurement window 203".

Figure 4B:
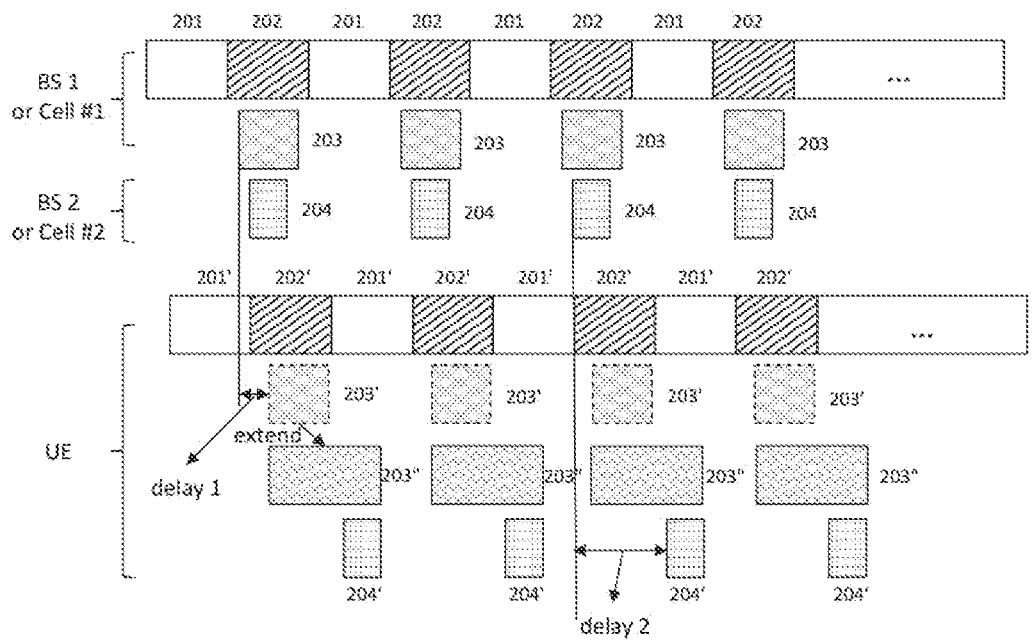
FIG. 4B illustrates a timeline with extended measurement window in accordance with some embodiments of the subject disclosure.

FIG. 4B illustrates a timeline with extended measurement window in accordance with some embodiments of the subject disclosure.

In FIG. 4B, the UE extends the measurement window 203' to the extended measurement window 203". After the extension, the UE is able to measure the reference signal from BS2.

The UE may perform the offsetting and extending when the measurement assistance information is available, the UE may offset and extend the measurement window. The UE may offset and extend the measurement window periodically with this period, or when a timer expires.

The UE may perform the offsetting and extending when a parameter value is within the configured range. The parameter may include propagation delay, timing advance, distance, receiving power, power pathloss of a neighboring BS or a neighboring cell. Take the parameter propagation delay for an example, the UE may perform the offsetting and extending the measurement window when the propagation delay difference of a neighboring BS and the serving BS is less than 10 ms, within the range from 10 ms to 20 ms, or larger than 20 ms. The parameter may also be propagation delay difference, timing advance difference, distance difference, receiving power difference, power pathloss difference of a neighboring BS or cell and the serving BS. Take the parameter propagation delay difference for an example, the UE may perform the offsetting and extending the measurement window when the propagation delay difference of a neighboring BS and the serving BS is less than 10 ms, within the range from 10 ms to 20 ms, or larger than 20 ms.

The UE may perform the offsetting and extending when the BS transmits a configuration of neighboring BS or neighboring cell measurement to UE, or when the UE fails to measure a reference signal from a neighboring BS or a neighboring cell.

In this way, the UE can determine the measurement assistance information although the measurement window 203' is misaligned with the SSB window 204'.

However, this measurement window 203" may partially or completely overlap with the block 201', which represents the resources for UE from BS1. Therefore, the UE may determine whether to extend the measurement window based on UE implementation. For example, when the resource for UE is overlapped less than a predetermined percentage, e.g. 30%, the UE can extend the measurement window.

For another example, the UE may only extend the measurement window until the resources for UE block 201'. In other words, the ending time of the measurement window 203' is extended to the starting time of the resources for UE block 201'. In this way, the UE extends the measurement window as much as possible while not affecting the normal transmission or reception with BS1.

After extending the measurement window, the UE may or may not transmit a report for the measurement adjustment to the BS, which is also determined by the UE. For instance, when the resources for UE is overlapped less than a predetermined percentage, e.g. 30%, the UE may not report the measurement adjustment, otherwise, the UE transmits the report for the measurement adjustment.

In the third solution, the serving BS may obtain measurement assistance information (e.g. the common propagation delay) from the neighboring BS or the neighboring cell to configure measurement window.

Compared with the first solution, the third solution has less accuracy. These solutions can be applied for all neighboring BS/cell measurement configuration, e.g. SMTC measurement or SFTD (SFN and Frame Timing Difference) measurement.

Figure 5:
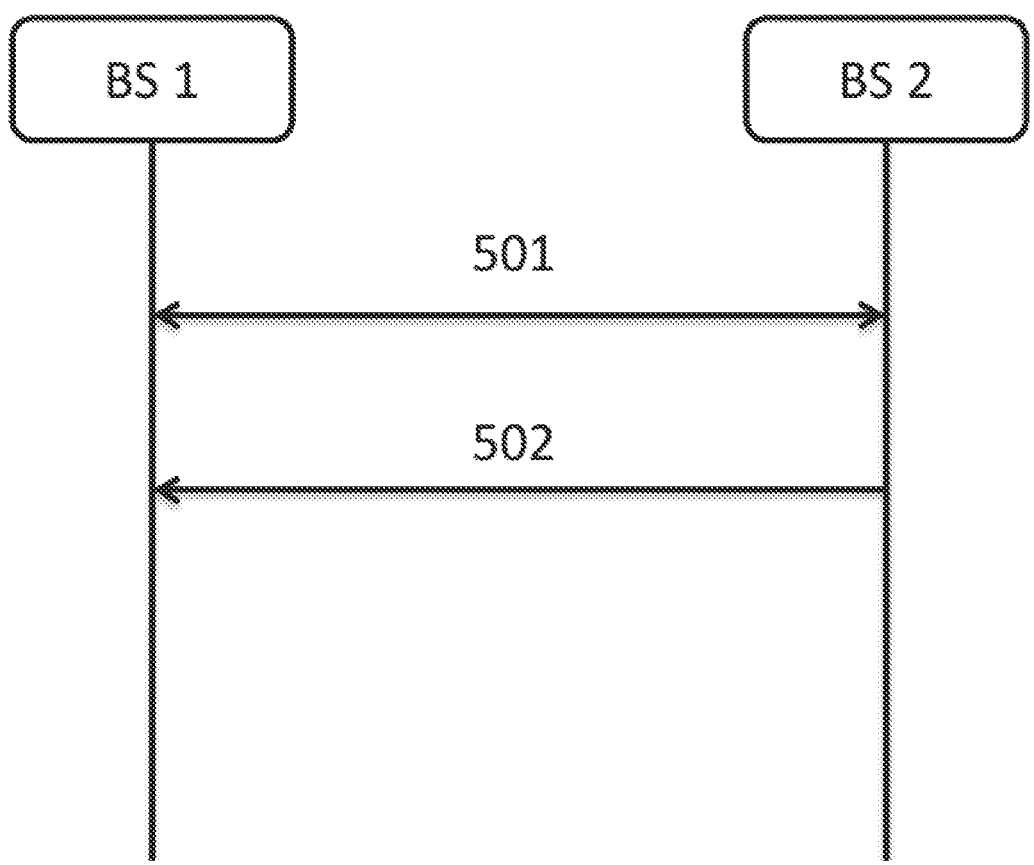
FIG. 5 illustrates a flow chart for determining measurement assistance information in accordance with some embodiments of the subject disclosure.

FIG. 5 illustrates a flow chart for determining measurement assistance information in accordance with some embodiments of the subject disclosure.

In this embodiment, the BS may send a request to other BSs for measurement assistance information. In step 501, BS1, the serving BS, send a request to BS2, the neighboring BS, for measurement assistance information via the inter-BS interface, for example, the Xn interface or X2 interface, and the like.

The request from BS1 to BS2 may include the following parameters:
  i. an indication of exchanging measurement assistance information.
  ii. request of average round-trip delay, common round-trip delay, reference round-trip delay, average single-trip delay, common single-trip delay, reference single-trip delay from BS2 to its served UEs or in a cell belonging to BS2.
  iii. request of average timing advance, common timing advance, or reference timing advance from BS2 to its served UEs or in a cell belonging to BS2.
  iv. request of average distance, common distance, or reference distance from BS2 to its served UEs or in a cell belonging to BS2.
  v. request of average receiving power, common receiving power, or reference receiving power from BS2 to its served UEs or in a cell belonging to BS2.
  vi. request of average power pathloss, common power pathloss, or reference power pathloss from BS2 to its served UEs or in a cell belonging to BS2.
  vii. request of an ID of one or more cells belonging to BS2.

In step 502, BS2 transmits a response to the request via the inter-BS interface, which might include a positive response or a negative response.

The positive response may include the content requested by BS1, for example, the positive response may include:

i. average round-trip delay, common round-trip delay, reference round-trip delay, average single-trip delay, common single-trip delay, reference single-trip delay from BS2 to its served UEs or in a cell belonging to BS2.
  ii. average timing advance, common timing advance, or reference timing advance from BS2 to its served UEs or in a cell belonging to BS2.
  iii. average distance, common distance, or reference distance from BS2 to its served UEs or in a cell belonging to BS2.
  iv. average receiving power, common receiving power, or reference receiving power from BS2 to its served UEs or in a cell belonging to BS2.
  v. average power pathloss, common power pathloss, or reference power pathloss from BS2 to its served UEs or in a cell belonging to BS2.
  vi. an ID of one or more cells belonging to BS2.

The BS2 may reject the request from BS1, and transmit a negative response, which may include a reject to the request; additionally, BS2 may further transmit the reason for the rejection to BS1.

Figure 6:
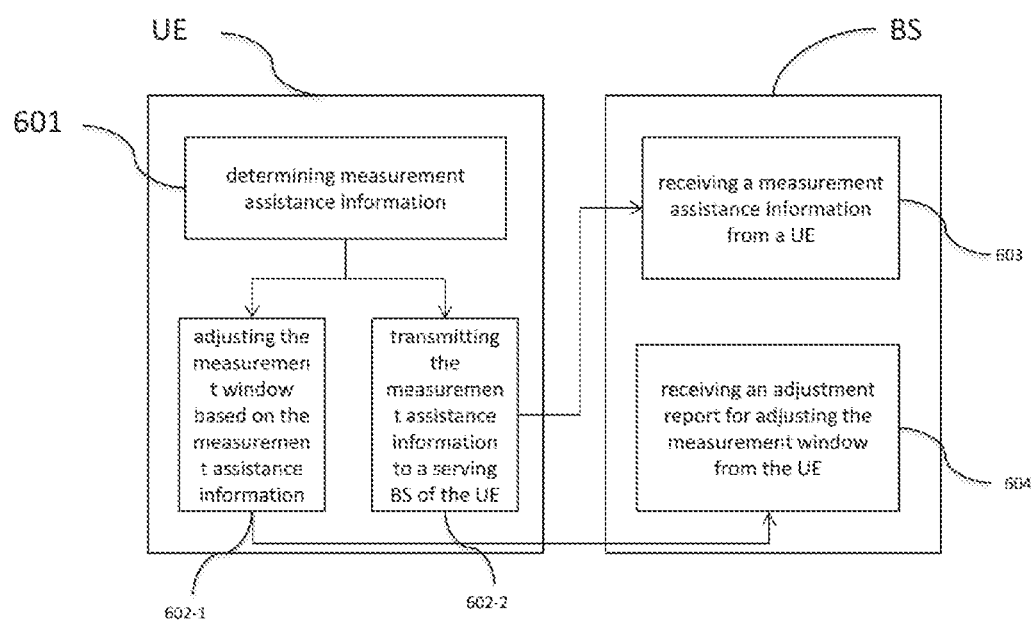
FIG. 6 illustrates a method for determining measurement assistance information in accordance with some embodiments of the subject disclosure.

FIG. 6 illustrates a method for determining measurement assistance information in accordance with some embodiments of the subject disclosure.

In step 601, the UE may determine measurement assistance information, wherein the measurement assistance information is used for determining or adjusting one or more measurement windows for one or more neighboring BSs or one or more neighboring cells. In step 602-1, the UE adjusts the measurement window based on the measurement assistance information, and may transmit the adjustment report for adjusting the measurement window from the UE to the BS. Correspondingly, the BS may receive the adjustment report for adjusting the measurement window from the UE. For example, in FIG. 4, the UE offsets the start or the end of the measurement window, or extends the measurement window, and transmits the adjustment report to the BS. Alternatively, the UE may not transmit the adjustment report.

In step 602-2, the UE transmits the measurement assistance information to a serving BS of the UE, at the BS's side, the BS receives the measurement assistance information to a serving Base Station (BS) of the UE. For example, in FIG. 3, the UE transmits the measurement assistance information report to the serving BS.

The BS may transmit a request for the measurement assistance information or a configuration for the measurement assistance information to the UE via a system information broadcast or a dedicated signaling. For example, the request or configuration may be transmitted in a system information block or in the RRC signaling.

After determining the measurement assistance information, the UE may transmit it to the BS. Alternatively, the UE may transmit an adjustment report for adjusting the measurement window after adjusting the measurement window. The measurement assistance information or the adjustment report may be transmitted via dedicated signaling, such as RRC signaling, as a part of existing signaling, in a random access message, or in a MAC CE.

The measurement assistance information includes a measurement assistance information report for each neighboring BS or each neighboring cell, and/or a measurement assistance information report for a range determined by at least one of the following parameters: a propagation delay, a timing advance, a distance, a receiving power, a power pathloss. For example, in FIG. 1C, the measurement assistance information may include a measurement assistance information report for BS2, Cell #2.

The measurement assistance information includes at least one of the following parameters: i) a round-trip or single-trip propagation delay from the UE to a neighboring BS, e.g. BS2 in FIG. 1C, or a neighboring cell, e.g. Cell #2 in FIG. 1C; ii) an estimated timing advance from the UE to a neighboring BS or a neighboring cell; iii) a distance between the UE and a neighboring BS or a neighboring cell; iv) a receiving power of a neighboring BS or a neighboring cell at the UE; v) a power pathloss from a neighboring BS or a neighboring cell to the UE; vi) a round-trip or single-trip propagation delay difference from the UE to a neighboring BS or a neighboring cell and its serving BS; vii) an estimated timing advance difference from the UE to a neighboring BS or a neighboring cell and its serving BS; viii) a distance difference between the UE and a neighboring BS or a neighboring cell and its serving BS; ix) a receiving power difference of a neighboring BS or a neighboring cell and its serving BS at the UE; x) a power pathloss difference from a neighboring BS or a neighboring cell and its serving BS to the UE; xi) an ID of a neighboring BS or a neighboring cell; and xii) a reference signal with a time stamp.

The UE may transmit the measurement assistance information to the BS, adjust the measurement window, when the UE receives a request for the measurement assistance information or a configuration for the measurement assistance information from the serving BS; or when one or more predefined conditions in the request for the measurement assistance information or the configuration for the measurement assistance information from the serving BS are fulfilled.

In another embodiment, the UE may transmit the measurement assistance information or adjust the measurement window when the measurement assistance information is available; a timer for transmitting the measurement assistance information is expired; a parameter associated with the measurement assistance information is larger than or smaller than a first threshold; upon receiving a configuration for the measurement assistance information from a neighboring BS or a neighboring cell; and upon failing to measure a reference signal from a neighboring BS or a neighboring cell.

The UE may determine the measurement assistance information based on location information of the UE and the one or more neighboring BSs or the one or more neighboring cells; history data of the one or more neighboring BSs or the one or more neighboring cells; and/or information received from the one or more neighboring BSs or the one or more neighboring cells.

In some embodiment, the UE may transmit an indicator to the BS, which indicates that the UE is capable of reporting the measurement assistance information. In other embodiment, the UE may transmit an indicator to the BS, which indicates that the measurement assistance information is available.

In some embodiment, the BSs may exchange measurement assistance information with each other. One BS may transmit a request for measurement assistance information to another BS, via Xn interface, X2 interface, etc. The measurement assistance information is used for determining or adjusting one or more measurement windows for one or more neighboring Base Stations or one or more neighboring cells, and may receive a response of the measurement assistance information. For example, in step 501 in FIG. 5, BS1 transmits a request to BS2 for measurement assistance information.

The request for the measurement assistance information includes: an indication of exchanging the measurement assistance information; parameters associated with the measurement assistance information; and/or a cell ID belonging to the second BS.

After receiving the request, BS2 may transmit a positive response of the measurement assistance information, which may include the parameters requested by BS1, or parameters associated with the measurement assistance information; and a cell ID belonging to the second BS. Alternatively, BS2 may reject the request form BS1, and transmit a rejection to BS1. BS2 may further transmit a reason for the rejection to BS1.

In addition to transmitting a request for measurement assistance information to BS2, BS1 can also transmit the measurement assistance information to BS2.

Figure 7:
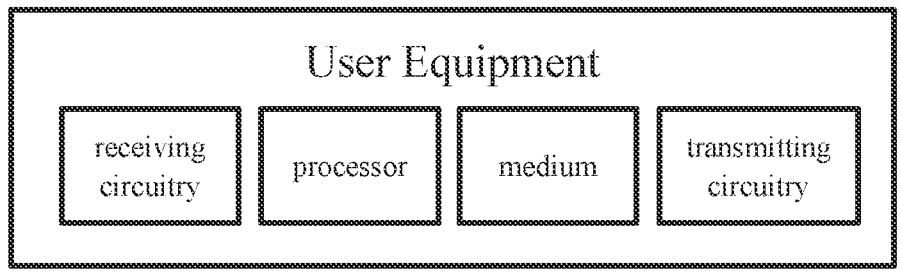
FIG. 7 illustrates a block diagram of a UE according to some embodiments of the subject disclosure.

FIG. 7 illustrates a block diagram of a UE according to the embodiments of the subject disclosure.

The BS may include receiving circuitry, a processor, and transmitting circuitry. In one embodiment, the UE may include a non-transitory computer-readable medium having stored thereon computer-executable instructions; receiving circuitry; transmitting circuitry; and a processor coupled to the non-transitory computer-readable medium, the receiving circuitry and the transmitting circuitry. The computer executable instructions can be programmed to implement a method (e.g., the method in FIG. 3) with the receiving circuitry, the transmitting circuitry and the processor. That is, upon performing the computer executable instructions, the processor determines measurement assistance information; and the transmitting circuitry further transmits the measurement assistance information to a serving BS of the UE.

Figure 8:
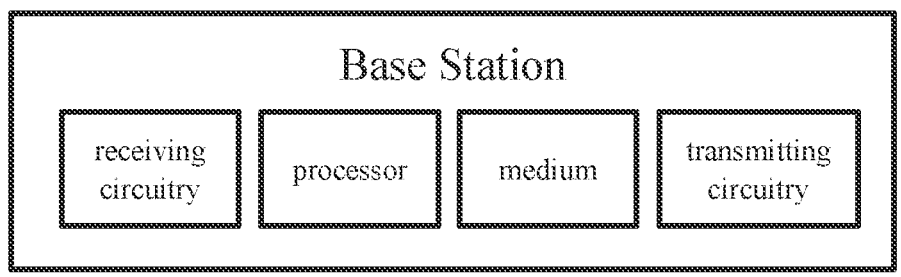
FIG. 8 illustrates a block diagram of a BS according to some embodiments of the subject disclosure.

FIG. 8 illustrates a block diagram of a BS according to the embodiments of the subject disclosure.

The BS may include receiving circuitry, a processor, and transmitting circuitry. In one embodiment, the UE may include a non-transitory computer-readable medium having stored thereon computer-executable instructions; receiving circuitry; transmitting circuitry; and a processor coupled to the non-transitory computer-readable medium, the receiving circuitry and the transmitting circuitry. The computer executable instructions can be programmed to implement a method (e.g., the method in FIG. 5) with the receiving circuitry, the transmitting circuitry and the processor. That is, upon performing the computer executable instructions, the receiving circuitry further receives a measurement assistance information from a UE, or receives an adjustment report for adjusting the measurement window from the UE.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a User Equipment (UE), the method comprising:
   determining measurement assistance information comprising one or more measurement assistance information reports for one or more neighboring Base Stations (BSs) or one or more neighboring cells, wherein the measurement assistance information includes:
      a first propagation delay between the UE and a serving BS or a serving cell; and
      one or more second propagation delays between the UE and the one or more neighboring BSs or the one or more neighboring cells; and
   causing a measurement window for the serving BS or the serving cell to be adjusted for a difference between the first propagation delay and the one or more second propagation delays based on:
      transmitting the measurement assistance information to the serving BS or the serving cell of the UE; or
      adjusting the measurement window for the serving BS or the serving cell based on the measurement assistance information.

2. The method of claim 1, further comprising:
   receiving a request for the measurement assistance information or a configuration for the measurement assistance information via a system information broadcast or a dedicated signaling.

3. The method of claim 1, further comprising:
   transmitting the measurement assistance information or an adjustment report for adjusting the measurement window in a dedicated signaling, as a part of existing signaling, in a random access message, or in a Medium Access Control (MAC) Control Element (CE).

4. The method of claim 1, wherein each measurement assistance information report is dependent on ranges of one or more parameters including a propagation delay, a timing advance, a distance, a receiving power, a power pathloss.

5. The method of claim 1, wherein the measurement assistance information includes at least one of:
   a round-trip or single-trip propagation delay from the UE to a neighboring BS or a neighboring cell;
   an estimated timing advance from the UE to the neighboring BS or the neighboring cell;
   a distance between the UE and the neighboring BS or the neighboring cell;
   a receiving power of the neighboring BS or the neighboring cell at the UE;
   a power pathloss from the neighboring BS or the neighboring cell to the UE;
   a round-trip or single-trip propagation delay difference from the UE to the neighboring BS or the neighboring cell and the serving BS;
   an estimated timing advance difference from the UE to the neighboring BS or the neighboring cell and the serving BS;
   a distance difference between the UE and the neighboring BS or the neighboring cell and the serving BS;
   a receiving power difference of the neighboring BS or the neighboring cell and the serving BS at the UE;
   a power pathloss difference from the neighboring BS or the neighboring cell and the serving BS to the UE;
   an ID of the neighboring BS or the neighboring cell; and
   a reference signal with a time stamp.

6. The method of claim 1, wherein a triggering condition for transmitting the measurement assistance information comprises at least one of:
   upon receiving a request for the measurement assistance information or a configuration for the measurement assistance information from the serving BS; and
   one or more predefined conditions in the request for the measurement assistance information or the configuration for the measurement assistance information from the serving BS are fulfilled.

7. The method of claim 1, wherein a triggering condition for transmitting the measurement assistance information or for adjusting the measurement window comprises at least one of:
   the measurement assistance information is available;
   a timer for transmitting the measurement assistance information is expired;
   a parameter associated with the measurement assistance information is larger than or smaller than a first threshold;
   upon receiving a configuration for the measurement assistance information from a neighboring BS or a neighboring cell; and
   upon failing to measure a reference signal from the neighboring BS or the neighboring cell.

8. The method of claim 1, wherein the measurement assistance information is determined based on at least one of:
   location information of UE and the one or more neighboring BSs or the one more neighboring cells;
   history data of the one or more neighboring BSs or the one or more neighboring cells; and
   information received from the one or more neighboring BSs or the one or more neighboring cells.

9. A method performed by a Base Station (BS), the method comprising:
   adjusting a measurement window for the BS for a difference between a first propagation delay and one or more second propagation delays based on:
      receiving a measurement assistance information from a User Equipment (UE), wherein the measurement assistance information comprises one or more measurement assistance information reports for one or more neighboring BSs or one or more neighboring cells, and the measurement assistance information includes:
the first propagation delay between the UE and the BS; and
the one or more second propagation delays between the UE and the one or more neighboring BSs or the one or more neighboring cells; or
receiving an adjustment report for adjusting the measurement window from the UE, wherein the measurement window is configured for the UE to determine the measurement assistance information for the one or more neighboring BSs or the one or more neighboring cells.

10. The method of claim 9, further comprising:
transmitting a request for the measurement assistance information or a configuration for the measurement assistance information via a system information broadcast or a dedicated signaling.

11. The method of claim 9, further comprising:
receiving the measurement assistance information or the adjustment report for adjusting the measurement window in a dedicated signaling, as a part of existing signaling, in a random access message, or in a Medium Access Control (MAC) Control Element (CE).

12. The method of claim 9, wherein each measurement assistance information report is dependent on ranges of one or more parameters including a propagation delay, a timing advance, a distance, a receiving power, a power pathloss.

13. The method of claim 9, wherein the measurement assistance information includes at least one of:
a round-trip or single-trip propagation delay from the UE to a neighboring BS or a neighboring cell;
an estimated timing advance from the UE to the neighboring BS or the neighboring cell;
a distance between the UE and the neighboring BS or the neighboring cell;
a receiving power of the neighboring BS or the neighboring cell at the UE;
a power pathloss from the neighboring BS or the neighboring cell to the UE;
a round-trip or single-trip propagation delay difference from the UE to the neighboring BS or the neighboring cell and the BS;
an estimated timing advance difference from the UE to the neighboring BS or the neighboring cell and the BS;
a distance difference between the UE and the neighboring BS or the neighboring cell and the BS;
a receiving power difference of the neighboring BS or the neighboring cell and the BS at the UE;
a power pathloss difference from the neighboring BS or the neighboring cell and the BS to the UE; and
an ID of the neighboring BS or the neighboring cell.

14. A user equipment (UE) for wireless communication, comprising:
at least one memory; and
at least one processor coupled with the at least one memory and operable to cause the UE to:
determine measurement assistance information comprising one or more measurement assistance information reports for one or more neighboring Base Stations (BSs) or one or more neighboring cells, wherein the measurement assistance information includes:
a first propagation delay between the UE and a serving BS or a serving cell; and
one or more second propagation delays between the UE and the one or more neighboring BSs or the one or more neighboring cells; and
causing a measurement window for the serving BS or the serving cell to be adjusted for a difference between the first propagation delay and the one or more second propagation delays based on:
transmitting the measurement assistance information to the serving BS or the serving cell of the UE; or
adjusting the measurement window for the serving BS or the serving cell based on the measurement assistance information.

15. The UE of claim 14, wherein the at least one processor is configured to cause the UE to:
receive a request for the measurement assistance information or a configuration for the measurement assistance information via a system information broadcast or a dedicated signaling.

16. The UE of claim 14, wherein the at least one processor is configured to cause the UE to:
transmit the measurement assistance information or an adjustment report for adjusting the measurement window in a dedicated signaling, as a part of existing signaling, in a random access message, or in a Medium Access Control (MAC) Control Element (CE).

17. The UE of claim 14, wherein each measurement assistance information report is dependent on ranges of one or more parameters including a propagation delay, a timing advance, a distance, a receiving power, a power pathloss.

18. The UE of claim 14, wherein the measurement assistance information includes at least one of:
a round-trip or single-trip propagation delay from the UE to a neighboring BS or a neighboring cell;
an estimated timing advance from the UE to the neighboring BS or the neighboring cell;
a distance between the UE and the neighboring BS or the neighboring cell;
a receiving power of the neighboring BS or the neighboring cell at the UE;
a power pathloss from the neighboring BS or the neighboring cell to the UE;
a round-trip or single-trip propagation delay difference from the UE to the neighboring BS or the neighboring cell and the serving BS;
an estimated timing advance difference from the UE to the neighboring BS or the neighboring cell and the serving BS;
a distance difference between the UE and the neighboring BS or the neighboring cell and the serving BS;
a receiving power difference of the neighboring BS or the neighboring cell and the serving BS at the UE;
a power pathloss difference from the neighboring BS or the neighboring cell and the serving BS to the UE;
an ID of the neighboring BS or the neighboring cell; and
a reference signal with a time stamp.

19. The UE of claim 14, wherein a triggering condition for transmitting the measurement assistance information comprises at least one of:
upon receiving a request for the measurement assistance information or a configuration for the measurement assistance information from the serving BS; and
one or more predefined conditions in the request for the measurement assistance information or the configuration for the measurement assistance information from the serving BS are fulfilled.

20. The UE of claim 14, wherein a triggering condition for transmitting the measurement assistance information or for adjusting the measurement window comprises at least one of:

the measurement assistance information is available;

a timer for transmitting the measurement assistance information is expired;

a parameter associated with the measurement assistance information is larger than or smaller than a first threshold;

upon receiving a configuration for the measurement assistance information from a neighboring BS or a neighboring cell; and upon failing to measure a reference signal from the neighboring BS or the neighboring cell.

\* \* \* \* \*